US006340935B1

(12) United States Patent
Hall

(10) Patent No.: US 6,340,935 B1
(45) Date of Patent: Jan. 22, 2002

(54) COMPUTERIZED PARKING FACILITY MANAGEMENT SYSTEM

(76) Inventor: Brett O. Hall, 4206 Lazy Creek Dr., Marietta, GA (US) 30066

(*) Notice: Subject to any disclaimer, the term of this patent is extended or adjusted under 35 U.S.C. 154(b) by 0 days.

(21) Appl. No.: 09/609,196

(22) Filed: Jun. 30, 2000

Related U.S. Application Data

(63) Continuation-in-part of application No. 09/443,331, filed on Nov. 19, 1999, now abandoned.
(60) Provisional application No. 60/118,928, filed on Feb. 5, 1999.

(51) Int. Cl.[7] .................................................. B60Q 1/48
(52) U.S. Cl. .................... 340/932.2; 340/933; 340/937; 340/942; 340/905; 340/995
(58) Field of Search ............................. 340/932.2, 933, 340/937, 942, 905, 995

(56) References Cited

U.S. PATENT DOCUMENTS 4,603,390 A * 7/1986 Mehdipour et al. ......... 364/467
5,432,508 A * 7/1995 Jackson ................... 340/932.2
5,748,107 A * 5/1998 Kersken et al. ............. 340/905
6,147,624 A * 11/2000 Clapper ................... 340/935.2

* cited by examiner

*Primary Examiner*—Daniel J. Wu
*Assistant Examiner*—Tai T. Nguyen

(57) ABSTRACT

The computerized parking facility management system manages parking operations. The contour of each vehicle that enters the parking facility is captured and quantified as part of its identification. The comparison with subsequent contour measurements at designated locations allows the parking location of the vehicle to be determined. An alternate embodiment implements the Global Positioning System to determine parking location. Variable message displays provide ongoing information to motorists of available parking spaces. The system identifies the specific vehicle parked in any parking space. The system provides computer searching to locate vehicles within the parking facility. A vehicle theft deterrence component automatically notifies the vehicle owner, the police, parking facility operators and other appropriate persons. This invention also integrates with parking revenue operations. All system functions and the viewing of vehicle identities and activities are accomplished through a single control interface. The control interface translates the dynamics of the parking environment into a computer environment and can transfer parking information through the Internet, email, and facsimile as well as stored it for subsequent review.

24 Claims, 12 Drawing Sheets

COMPUTERIZED PARKING FACILITY MANAGEMENT SYSTEM

CROSS REFERENCE TO RELATED APPLICATION

This application is a continuation-in-part of application Ser. No. 09/443,331 filed Nov. 19, 1999 now abandoned, which claims the benefit of U.S. Provisional Patent Application Serial No. 60/118,928 filed Feb. 5, 1999.

BACKGROUND OF THE INVENTION

1. Field of the Invention

The present invention relates generally to an improved system for the management of parking facilities. More particularly, the present invention relates to a computerized parking facility management system for capturing, tracking, and displaying the parking activities of vehicles in a parking facility. The present system further provides for the identification of each vehicle throughout the parking facility and the continuous determination of available parking spaces and their specific locations.

2. Description of the Related Art

During the last several years, the application of computer technology has had a tremendous impact on our lives. The use of items such as personal computers, hand-held personal organizers and computerized automotive controls are a few of the many examples how computer technology can facilitate in the efficient management of one's daily life. With the rapidly expanding use of the Internet, the implementation of computer technology into our daily lives will no doubt continue.

Despite the tremendous advances in computer technology, the advances in parking facility management have not kept pace. To prove this, one only need to try to find parking at a crowded retail business, large public events, airports or busy downtown areas. In fact, motorists spend more time than ever looking for parking vacancies. Furthermore, parking facility managers are still largely unaware of the dynamics of their facilities and even the occurrence of a vehicle theft is often unknown until after the vehicle has been removed from the parking facility.

As more vehicles are manufactured and purchased each year and combined with the numbers of existing vehicles it is apparent that parking is and will continue to be a public concern. The rapid and continuing growth of cities and suburban areas has resulted in an exponential growth of traffic and a need to provide improved parking for business patrons at malls and shopping areas, airports, employees, downtown areas, and large public events. However, providing improved parking does not always demand the construction of more parking spaces, but may only require better management of existing spaces.

Rudimentary computerized control and management of parking facilities are known in the related art. Several basic functions such as imputing the time a customer arrives and departs a given parking facility and applying an established rate and fee are commonplace today. These basic capabilities are outlined in the patents issued to U.S. Pat. No. 5,091,727 to Mahmood, U.S. Pat. No. 5,414,624 to Anthonyson, and U.S. Pat. No. 5,745,052 to Matsuyama et al.

Attempts have been made at expanding the scope of these capabilities, such as having the parking facility system assist a customer in finding a vacant parking spot as described in the above patent to Mahmood. However, the Mahmood system only indicates vacant parking spaces closest to the entrance or exit of a parking facility, not the closest vacant parking space from any point within the parking facility. Moreover, Mahmood's technique for the determination of parking vacancies is based solely on theoretical inventory in a database and not the actual spaces in the parking facility.

Basic vehicle theft deterrence from parking areas has been incorporated into computerized parking facility management systems, as described in U.S. Pat. No. 5,638,302 to Gerber. However, the Gerber system is dependent on ticket distribution and does not address other issues of parking facility management.

U.S. Pat. No. 5,845,268 to Moore discloses a computerized parking facility management system using electronic-based parking meters that help to apprehend parking violators. The Moore patent also outlines a method for detecting vacant parking spaces and monitors the movement of vehicles coming into and going out of a parking space. Moore's system is only applicable to identifying violators in park-for-charge facilities that use parking meters. Other related art is significantly dependent on human intervention for proper operation.

U.S. Pat. No. 5,432,508 to Jackson and U.S. Pat. No. 3,376,547 to Auer disclose systems that monitor individual parking spaces to determine occupancy. The Jackson system subsequently provides notification to motorist of parking availability. However, neither system is capable of verifying whether an object within a parking space is, in fact, a vehicle. Without the capability to differentiate a vehicle from other objects, including pedestrians, these systems will consider any object detected to be a vehicle and respond accordingly. Furthermore, these prior art systems lack the capability of automatically associating specific vehicles with their parking activities or provides means to communicate all parking activities of a specific vehicle.

None of the above prior art inventions, taken either singularly or in combination, is seen to provide real-time information on the various parking activities in a parking facility. Thus, a parking facility management system solving the aforementioned problems is desired.

SUMMARY OF THE INVENTION

Accordingly, it is a general objective of the present invention to provide real-time information relative to the dynamics of parking facilities, such as the arrival and departure of specific vehicles, the exact parking locations of the vehicles, the physical identification of the specific vehicles and the continuous determination of available parking spaces throughout the parking facility.

It is another object of the present invention to provide managers and operators of parking facilities the capability to instantly ascertain the status of an entire parking facility through a single information source.

Yet another object of the present invention is to provide a management system that prevents the unauthorized removal of a vehicle from a parking facility and automatically notifies the appropriate authorities.

These and other objects of the present invention are accomplished by the present invention which provides a computerized parking facility management system comprising vehicle characterization means for capturing contour features of each vehicle upon entry into the parking facility; means for tracking each vehicle within the parking facility; and computer means communicating with said vehicle characterization means and said tracking means, said computer means operative for processing and displaying real-time data pertaining to the location and identification of each vehicle within the parking facility.

Vehicle characterization is the system capture of a vehicle's inherent and inseparable attributes that can exist only when and where the vehicle exists. Characterization results are used to establish a unique vehicle identity, which may serve as a reference for vehicle tracking. In the primary embodiment the vehicle characterization means includes the use of sensors to capture the vehicle's contour. Digital cameras may also be used to photograph the vehicle and its license plate. The conversion of the license photograph to computer-recognizable text allows the present sytem to computer process the license to provide features such as the determination of the vehicle's parked location by using the license as search criteria.

The computer means of the present system includes a comprehensive and versatile "Park Interface" for viewing the dynamics of the parking facility and controlling the various system functions. The Park Interface is viewable on a computer screen and serves as a simulation of the parking facility activities by duplicating the real-time parking occupancies and vacancies occurring within the parking facility. The interface also provides for visual identification of vehicles parked in any space and includes statistics regarding the time and date of vehicle entry into the facility and the parking space. The computer means also provides for the capture, display, storage, organization, retrieval and documentation of all parking activities and vehicle identities of any vehicle that parks in the facility. The computer means of the present system may further include Internet, fax and e-mail capabilities to support the transmission of parking facility activities and vehicle identities. The capability to instantly see the status of an entire parking facility through a single information source is a significant advance over the prior art.

The availability of parking spaces within the facility is communicated to motorists through variable message displays. As sensors determine the presence or absence of vehicles within parking spaces the displays are continuously updated to reflect actual parking availability. The system further conveniences motorists by providing a vehicle theft deterrent system which activates alarms and barriers to restrict removal of the vehicle from the facility as well as to automatically notify police, local security, the vehicle owner and other key persons upon an attempted unauthorized removal of a vehicle. Thus, the present system not only makes finding available parking faster and easier, but also heightens security.

The present system thus provides managers and operators of large parking facilities a comprehensive knowledge of their parking occupancies and vacancies, when they occur and their exact locations. The capacity percentage of a parking facility is no longer a mystery with the present system since the continuous inventory of all vehicles and their respective locations is conveniently accessible. The present system may also be integrated with standard parking revenue controls to alleviate the need for manual and costly inventory operations.

These and other objects of the present invention will become readily apparent upon further review of the following specification and drawings.

BRIEF DESCRIPTION OF DRAWINGS

Similar reference characters denote corresponding features consistently throughout the attached drawings.

DETAILED DESCRIPTION OF THE PREFERRED EMBODIMENTS

Figure 1:
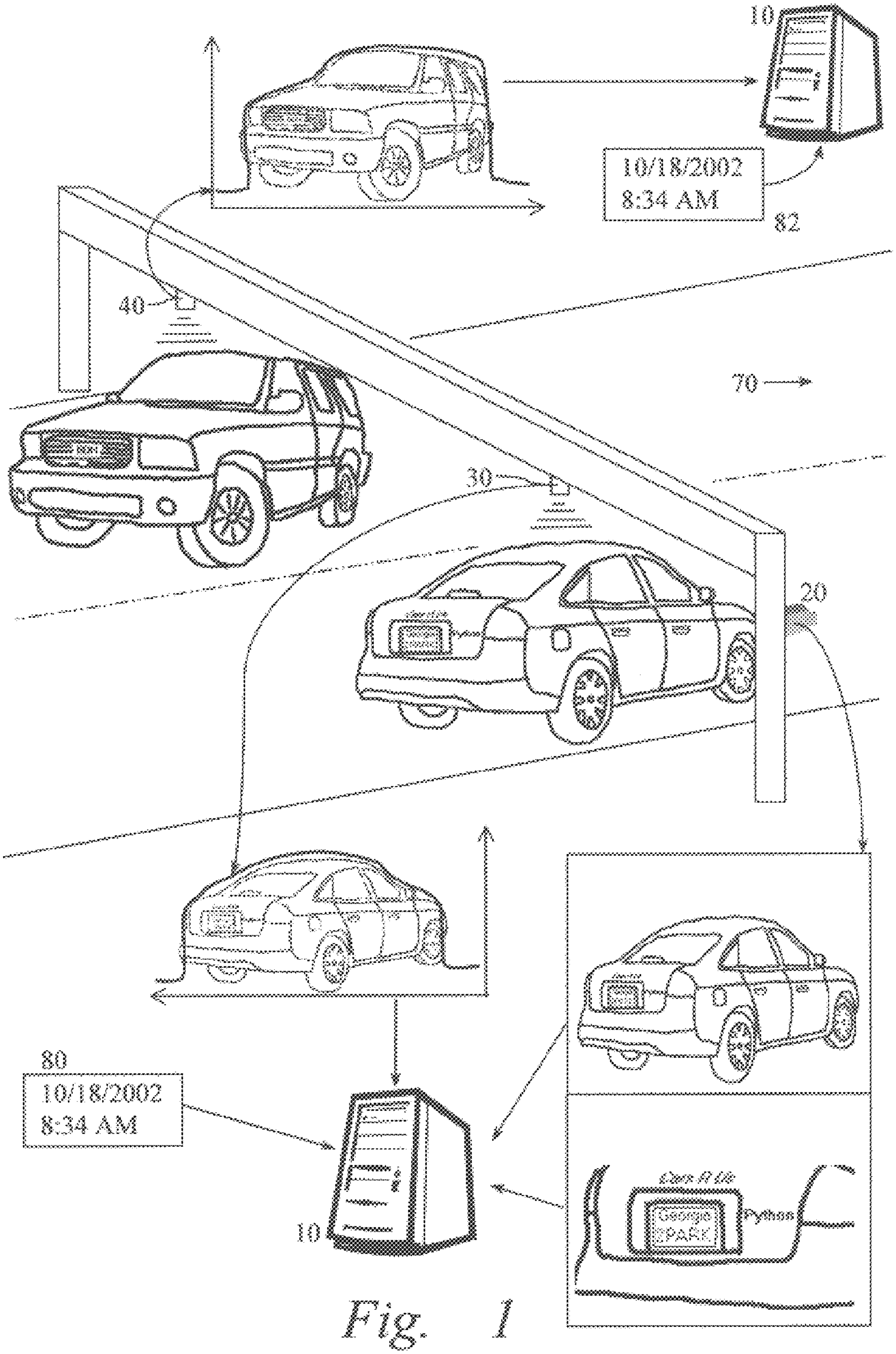
FIG. 1 is a perspective view of the entrance of the computerized parking facility management system of the present invention for capturing of vehicle contour and visual identities.

The computerized parking facility management system of the present invention provides improved management of parking facilities through rapid identification of vehicles, the determination and display of parking activities for each vehicle, the identification and notification of available parking spaces, and theft deterrence of vehicles parked in the parking facility. All information and control functions of the present invention are provided through a single computer interface. Executing these functions begins with characterizing each vehicle as it enters the parking facility 70 as shown in FIG. 1.

The capability to identity a specific vehicle within the parking environment allows the association between that vehicle and its activities as well as confirmation of parking space occupancy by the vehicle. The primary embodiment of this invention uses the vehicle's contour to make this identification. Different makes and models of vehicles are clearly distinguishable because of the difference in contours. The contour of most vehicles includes the hood, front and rear windshields, roof, front and rear bumpers, and trunk. From vehicle to vehicle, these surfaces have different heights, curvatures, and angles. This invention captures and quantifies those physical attributes to uniquely characterize a vehicle so as to determine the location of the vehicle. When times and dates are combined with the knowledge of vehicle locations then the association between specific vehicles and their parking activities are established.

Obviously the size and shape of vehicles produce a drastically different contour from those of pedestrians. Since the primary embodiment of this invention uses contour differences to differentiate objects the vulnerabilities of false detection due to the presence of a pedestrian are prevented.

The physical attributes of a vehicle contour are expressed numerically for computer processing. Mathematical methods to quantify a curve and to compare curves for similarity are commonly known. These techniques support distinguishing different vehicles as well as distinguishing between vehicles and pedestrians.

The comparison of contour data (or derivations of those data) from sensors at different locations supports vehicle tracking. This is especially applicable in determining the parking location. The contour from a sensor positioned to detect the parking vehicle will likely detect only part of the total contour since the vehicle will not be driven completely through the space. Therefore, the system will determine the vehicle based upon its last known location and comparison with the portion of the contour that was detected by the sensor at the parking location.

The comparison of contours (or derivations thereof) will also allow the system to determine the vehicle make and model by using a known reference of contour related information. For example, a database containing the contour identification for specific makes and models can be maintained. Then a comparison between the contour of a target vehicle against the database will indicate the make and model of the target vehicle. As described later this allows the system to search the parking facility for the parking locations of a specific make and model.

The optimum system configuration uses a microprocessor to analyze sensor data and validate that the data resembles a vehicle so that only positive notification of a vehicle's presence is transmitted to the system computer over a sensor network. Without the microprocessor the system computer must validate sensor data. The microprocessor can also be used to support communications with the system computer over the sensor network.

The present choice of technology to capture the vehicle contour as the vehicle enters the parking facility 70 is ultrasonic. However, other technology capable of emitting energy against the vehicle and receiving a reflection that varies according to the vehicle's contour is also applicable. Sensor manufacturers integrate communications hardware as part of the sensor's operation in order to allow a sensor network to be established. Each sensor in the network is assigned a unique address so that the data indicating a specific vehicle at a particular sensor location is distinguishable. The sensor 30 mounted over the parking facility 70 entrance scans the vehicle as it passes. The change in the distance from the sensor 30 to target surfaces of the vehicle defines the vehicle contour. The dimensions of different vehicles will produce different vehicle contours as shown in FIG. 1. The capture of the vehicle contour by the entry sensor 30 notifies the computer 10 that another vehicle has entered the parking facility 70. The time stamp of a vehicle's location occurs when the computer 10 logs the date and time that a sensor transmits that vehicle's contour.

Visual vehicle identities are captured with the digital camera 20. As also shown in FIG. 1, the digital camera 20 records the vehicle's manufacturer, model, color and license plate. The digital camera 20 and entry sensor 30 information are combined with the date and time of the vehicle's entry 80 into the parking facility 70 and stored in the system computer 10. The date and time of the entry 80 into the parking facility 70 is the first vehicle activity. The specific parking location along with the date and time of parking establishes another vehicle activity. Yet another vehicle activity occurs when a vehicle leaves the parking facility 70 and the departing exit date and time 82 are recorded. FIG. 1 shows that another sensor 40 at the exit can be used to capture the vehicle contour as a vehicle exits the parking facility 70. This is the conclusive action that will confirm the exit and complete the activities for the target vehicle.

The vehicle identification is the characteristics and information that uniquely defines the vehicle. Examples include the contour, photographs, license tag, manufacturer, model, color, owner, insurance agent, and (if applicable) the company for activating and tracking the transmitter within the vehicle if stolen. Vehicle activities are the dates and times of a vehicle's entry into and exit from the parking facility and the parking space. Vehicle activities also include the vehicle's parking location, revenue charged, and whether it is being monitored for theft prevention. Vehicle statistics are the combination of the vehicle identification and the vehicle activities and is the documentation of the vehicle's presence and history while within the parking facility. As explained later this invention uses the Park Interface to communicate the most appropriate vehicle statistics in support of system functions. When a vehicle exits the parking facility all information associated with the vehicle will be deleted from the system unless a parking facility operator previously requested that this information be archived.

Figure 2:
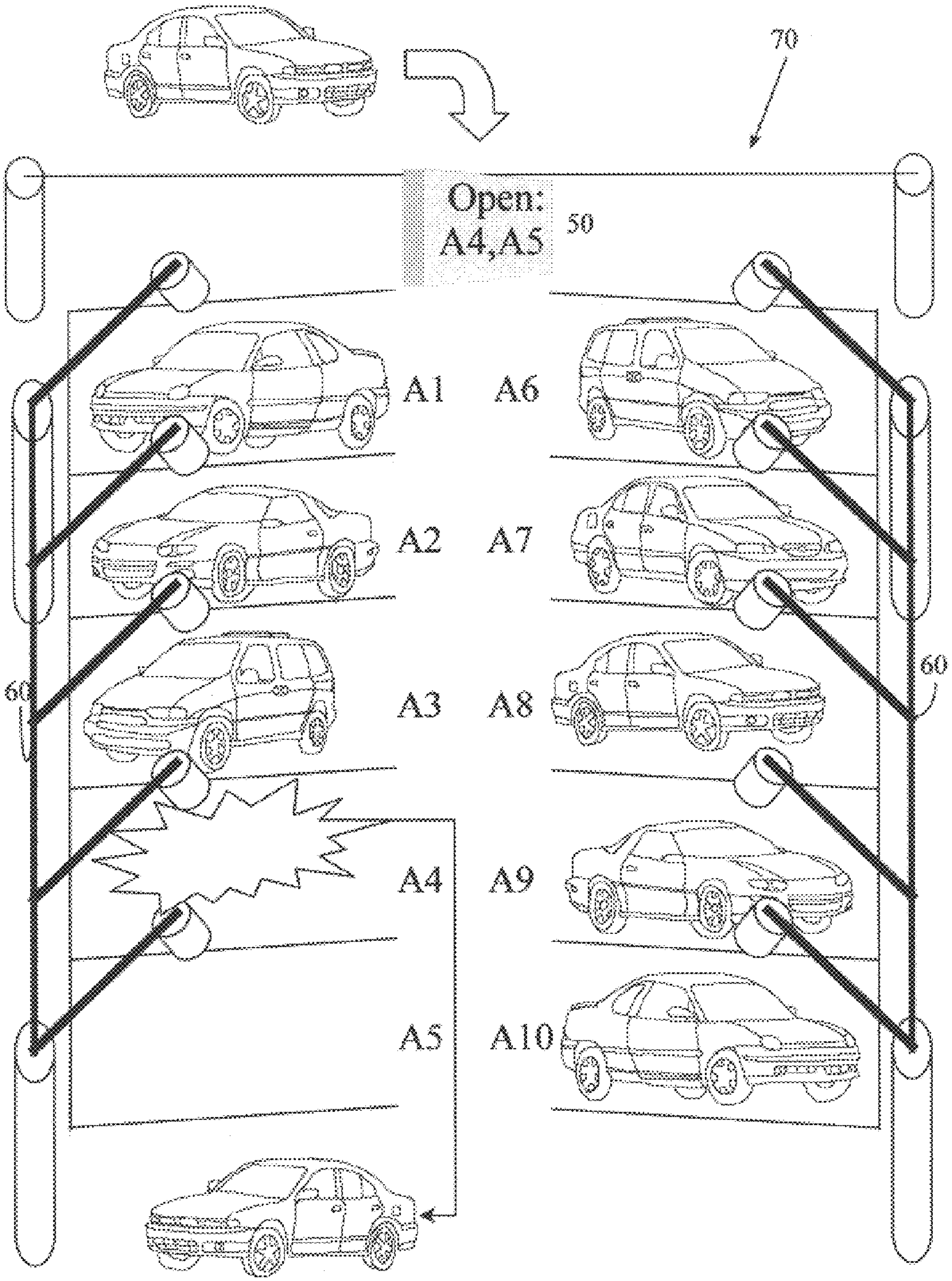
FIG. 2 illustrates a parking facility utilizing the present computerized parking facility management system to locate vacant parking spaces for motorists.

FIG. 2 illustrates the typical dynamics of a parking facility 70, with vehicles coming and going at random times and motorists looking for a space closest to the entrance of their destination. FIG. 2 also shows sensors 60 mounted over each parking space. The parking sensors 60 are of the same technology as the entry sensor 30 and exit sensor 40 and similarly capture the vehicle contour as the vehicle pulls into a parking space. The contour related information from the entry sensor 30 and the parking sensor 60 are compared to identify which vehicle has parked in which parking space. This enables the number and location of the remaining parking spaces to be readily determined. The contour comparisons also confirm the object within the parking space as a vehicle. Contour related information from one or more tracking sensors, positioned between the entry sensor and the parking sensor, may also be used in the said comparison.

FIG. 2 also represents a subset of the primary embodiment, for the determination and notification of parking space occupancy. This subset system still implements the contour methodology but the visual vehicle identities provided by the digital camera are excluded. Photographs are not required for the system to identify vehicles since the contour methodology serves this purpose. The system uses the photographs in the full primary embodiment as shown in the FIGS. 4, 5, 7, and 10 to ideally convey to parking facility operators the specific vehicle that is associated with a parking location or other activity.

An important part of implementing this invention includes the ability to track each vehicle. The computer 10 database contains the geographical location of each sensor, each sensor's unique communications network address, and an indication of the last vehicle that was detected by the sensor. As the vehicle travels throughout the parking facility the contours detected at various sensors are compared to determine the vehicle's location and the database is updated accordingly. Identical make and model vehicles are distinguished by the time of entry and present location of each vehicle. Even if multiple vehicles of the exact same make and model enter the parking facility 70 consecutively, they are each tracked and kept distinct. The method of tracking vehicles in the primary embodiment uses contour sensors (not shown). Another method of vehicle tracking is the Global Positioning System (GPS) and is described later as an alternate embodiment. Technology that supports the contour methodology is the best mode for this invention because of the insufficient number of vehicles equipped with GPS technology at this time.

Figure 3:
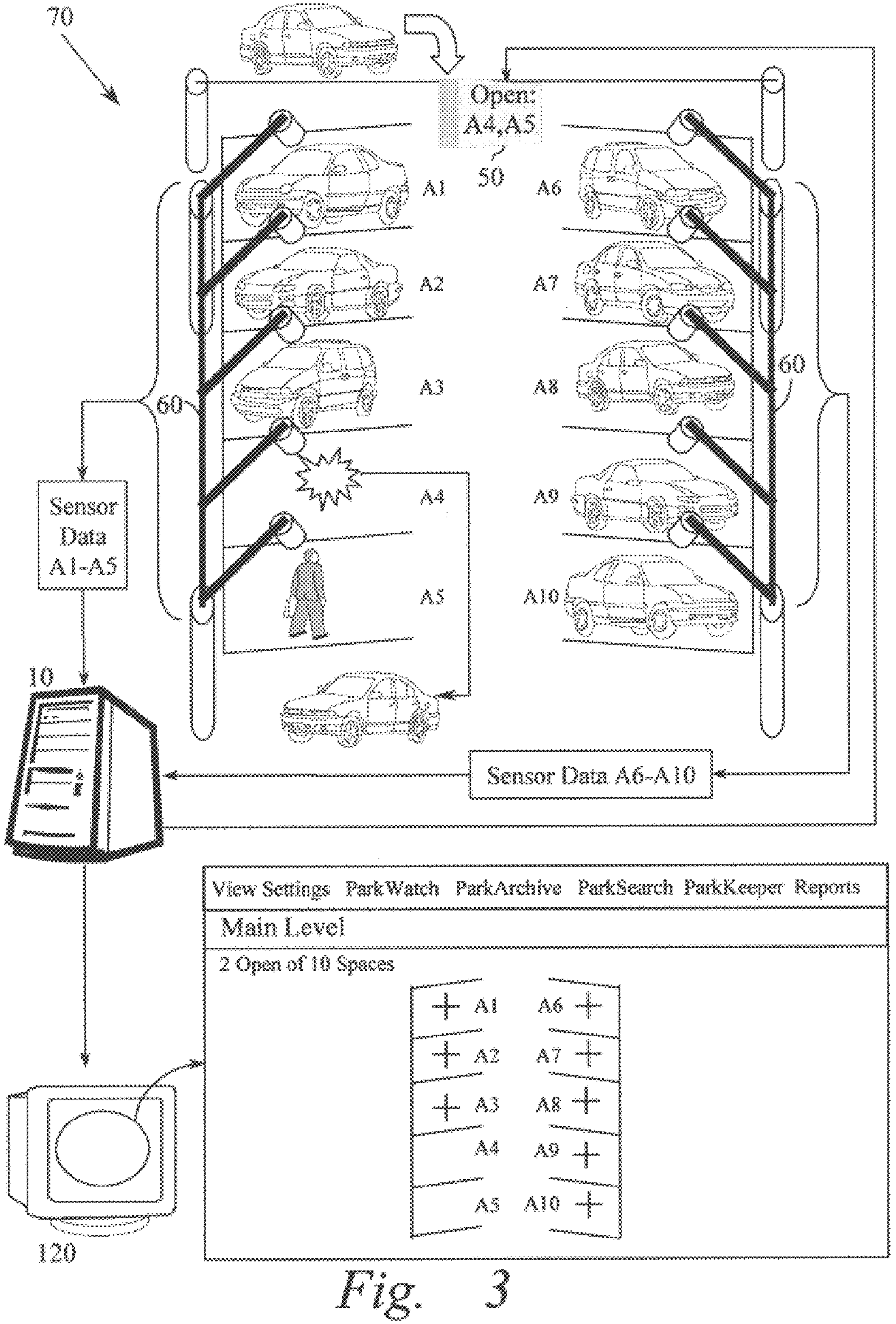
FIG. 3 is a perspective view of a section of a parking facility and a graphical replica of the parking status of the section displayed by the Park Interface of the present invention.

FIG. 3 demonstrates how the dynamics of the parking traffic are conveyed from the sensors 60 to the rest of the computerized parking facility management system. The computer 10 uses the output (A1–A5, A6–A10) from the parking sensors 60 to determine the vehicle that is parking in a given space. The sensors can capture vehicle contour independently of a polling commands from the computer 10. This distributed control prevents the sensors from missing parts of the vehicle surface that might otherwise pass the sensor between commands. The data is transmitted is such a way that the computer 10 can determine the originating sensor. The computer 10 then updates variable message displays 50, strategically located throughout the parking facility 70, to notify motorists of vacant parking spaces in a specific section of the parking facility 70. The displays 50 are conspicuously mounted in each section of the parking facility 70 and convey the location of vacant parking spaces using markings that uniquely label each space (A1 through A10) within the actual parking area. Without such labels the variable message displays 50 will simply show the total number of open spaces. As depicted at the top of FIG. 2 and FIG. 3, the motorist in the vehicle is guided to the nearest available parking spaces. Without notification from the variable message displays 50, the motorists will continue to drive throughout the parking facility 70 looking for an open space. As communication improvements continue with Internet-enabled personal organizers and mobile telephones, eventually motorists will be able to receive notification of available spaces through the display of these devices.

In FIG. 3, the Park Interface 120 provides a simulation of the actual parking facility dynamics. It is a computer-generated environment used to provide control of and extract information from the computerized parking facility management system. A principle component of the Park Interface 120 is a computer screen graphical replica of a section of the parking facility 70 that shows the number of spaces, their physical layout, location and parking status. The location of the parking spaces are indicated by the arbitrary name, such as "Main Level", given to a section of the parking facility combined with the individual parking space label, such as "A1". In case all of the graphical parking spaces within the defined section are not within the computer screen view the total number of spaces within the section as well those spaces that are open is indicated by a summary label such as "2 Open Of 10 Spaces". The parking status symbol (+) provides a graphical indication whether a particular space is occupied with a vehicle. With the present invention, every space within a parking facility is unique because of its location. The section name and parking location label help to properly categorize and reference each space so that each vehicle in each space is further defined as unique. Although the graphical replica is a more optimal configuration to display the status and location of parking spaces, a spreadsheet representation is also applicable.

The Park Interface 120 also includes various menu options to control system functions, collect parking information and to configure the appearance of the environment. The Park Interface 120 also provides various windows that support the system functions as well as display the results of requested information. Examples of the variability of the Park Interface 120 are presented by observing FIGS. 3, 4, 5, 6, 7, 10 and 12.

A facility operator can readily view any parking section and even view several parking sections simultaneously through independent view windows within the Park Interface 120. The scale of the parking replica, the number of view windows and the size of the parking section determine how much of the parking section is visible within a view window. This is accomplished through the use of the "View Settings" function for either static or dynamic monitoring of the parking areas.

During static monitoring, dragging the mouse pointer arrow along horizontal and vertical scroll bars allows manual positioning of any portion of the parking section that does not fit within the view window(s). A different parking section can also be viewed in any window through a manual invocation. During dynamic monitoring, the computer 10 automatically scrolls to reveal parking spaces that otherwise do not fit within the view the window. Dynamic monitoring also automatically updates the view window(s) to show all parking sections in the entire parking facility 70. Static monitoring is used when facility operators need to quickly observe any desired section or parking space, otherwise dynamic viewing is chosen. In addition to updating the variable message displays 50 for motorists, the parking status on the Park Interface 120 is also updated as changes actually occur in the parking facility 70. Thus the capability to view the real-time parking status of the entire parking facility 70 through a single information source is provided.

The Park Interface 120 of FIG. 3 provides menu options to several functions of the computerized parking facility management system. The "Park Watch" function allows the facility operator to receive notification based on the occupancy status of a target parking space as outlined in the discussions of FIG. 6 and FIG. 7.

The "Park Archive" function stores a vehicle's statistics on the computer's 10 storage medium. The details of the Archive function are described in the discussion of FIG. 6. The "Park Search" function is described in greater detail in the discussions on FIG. 5. The "Park Keeper" function is also described in greater detail in the discussions on FIG. 8, FIG. 9 and FIG. 10. The system can maintain a database of the number of vehicles that parked within the parking facility, their location, their parking start times and parking duration. The "Reports" function can then customize all the information in desired formats and statistical arrangements to conduct capacity planning, facility accounting and capacity trend analysis.

Figure 4:
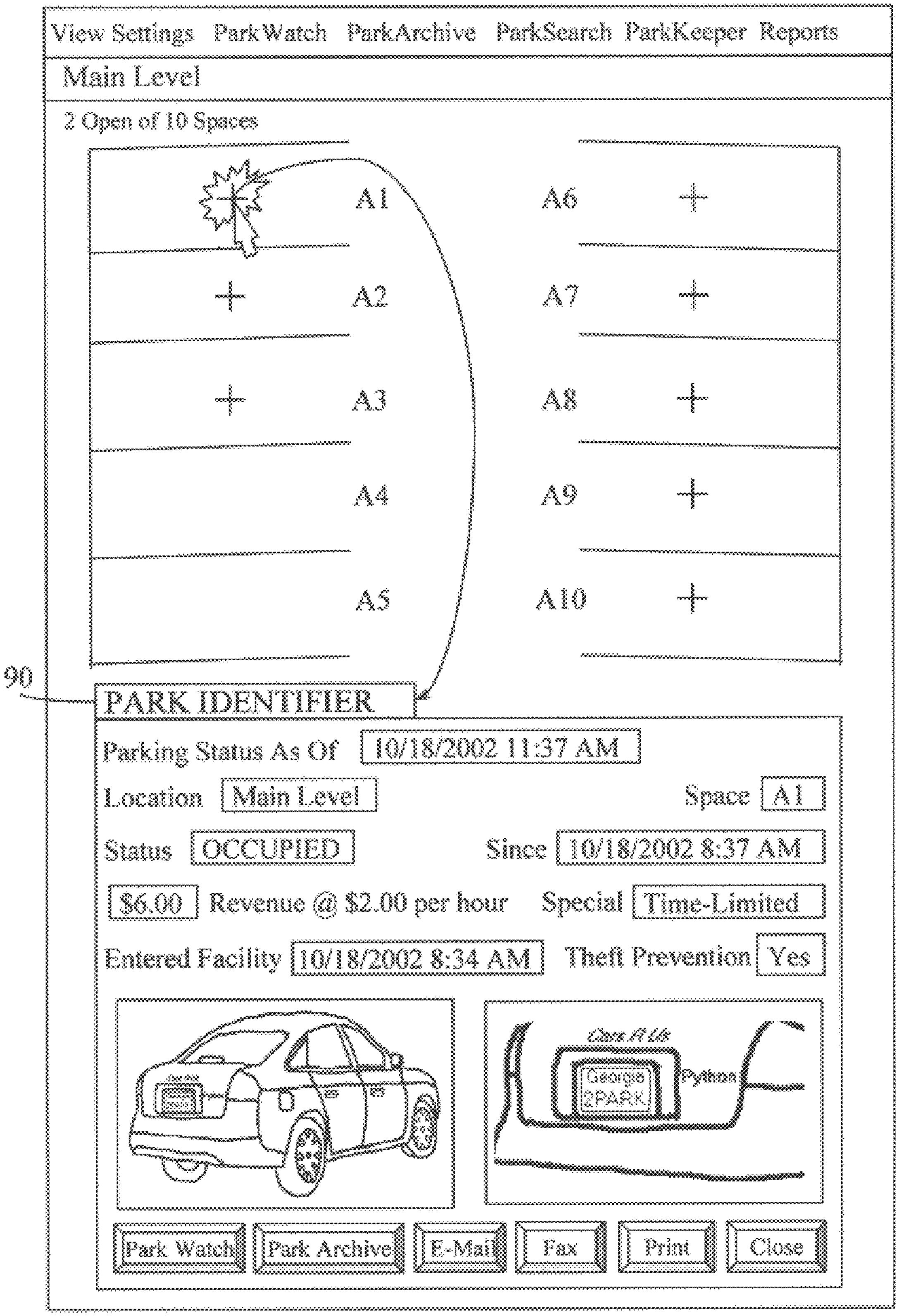
FIG. 4 shows the Park Interface's graphical replica of a parking section and the vehicle identification function for identifying a vehicle in a selected parking space.

FIG. 4 describes another feature of the computerized parking facility management system, which is the "Park Identifier" 90. When the computer pointer arrow is used to select a (+) symbol within the graphical parking replica that indicates an occupied space, the Park Interface displays the vehicle statistics of the occupying vehicle. In addition to displaying the photographs taken by the digital camera as the vehicle statistics of the occupying vehicle. In addition to displaying the photographs taken by the digital camera as the vehicle entered the parking facility, the Park Identifier 90 also shows the date and time of entry into the parking facility, the date and time of parking, confirmation of the parking location, the parking space label, the parking status of the space, and time of the parking status inquiry.

If the target space has a special designation, such as time-limited, reserved or for disabled persons, that special designation is displayed. If the parking facility charges for parking, then the revenue generated since the vehicle has been parked is also displayed. The charge rate is included because some charge-for-park facilities charge a higher rate for premium spaces versus economy spaces. Airport parking is a typical example. Finally, the Park Identifier 90 form shows if the vehicle is being monitored against theft by the Park Keeper theft prevention function, which will be described in the discussion of FIG. 8, FIG. 9 and FIG. 10.

The bottom of the Park Identifier 90 shows six command buttons. The first button is "Park Watch ", which allows the facility operator to be notified when the time for the time-limited space has been exceeded. The second button is "Park Archive", which requests that the Park Identifier 90 information and the date and time of the vehicle's exit form the parking space and the parking facility be saved on the computer's storage medium, for indefinite retrievals. The third button is "E-Mail", which allows the Park Identifier 90 form to be e-mailed over the Internet or private computer network. The remaining buttons allow the Park Identifier 90 form to be faxed, printed or closed.

Figure 5:
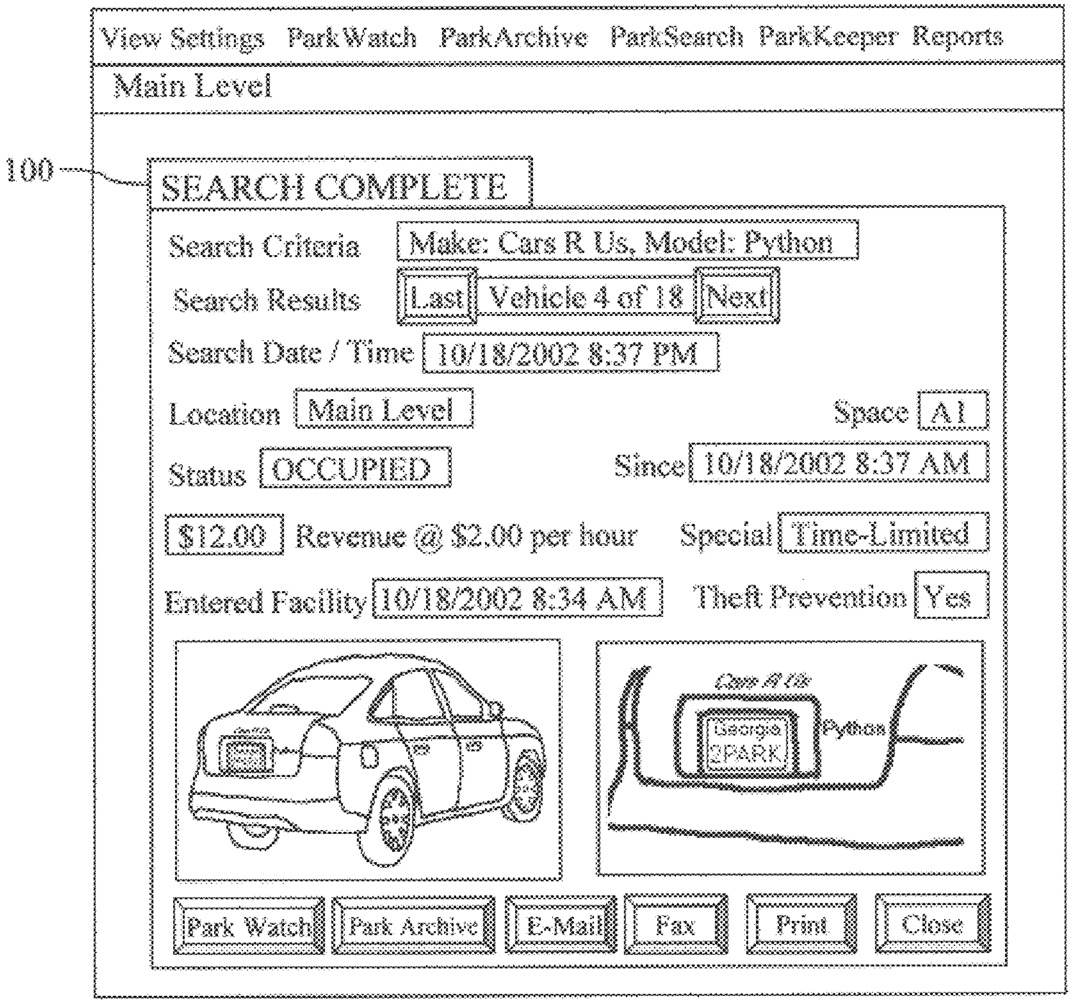
FIG. 5 is a view of the Park Interface computer screen displaying the search function of the computerized parking facility management system.

The result of the Park Search function 100 is depicted in FIG. 5. This function allows a parking facility operator to search an entire parking facility 70 for specific vehicles. The search conclusion is the result of querying the computer's database. Facility operators define their own search criteria, such as "find all vehicles that have generated revenue of an arbitrary amount ", "find all vehicles that parked between any two dates or times", "find all vehicles that parked in a particular area", "find all vehicles that parked in specially designated spaces (time-limited, disabled parking, visitor or reserved parking)", "find all vehicles of a specific make and model", "find all vehicles with a license plate from a specific state" or "find all vehicles with a license plate matching specific characters". A search can also be done based on combinations of criteria. By selecting the "Next" and "Last" buttons of the Search Results, a facility operator can scroll through all of the vehicles that meet the chosen "Search Criteria". FIG. 5 also indicates that the information can be printed or transmitted by e-mail. The "Park Watch" and "Park Archive" buttons function as mentioned above.

Optical Character Recognition (OCR) and License Plate Recognition (LPR) will support the Park Search 100 feature by providing the conversion of the license plate photograph to computer-recognizable text. Components for these technologies are available from various vendors. By analyzing vehicle contours, searches can be done to locate vehicles according to their make and model since the contour of a vehicle is a distinguishing feature.

Figure 6:
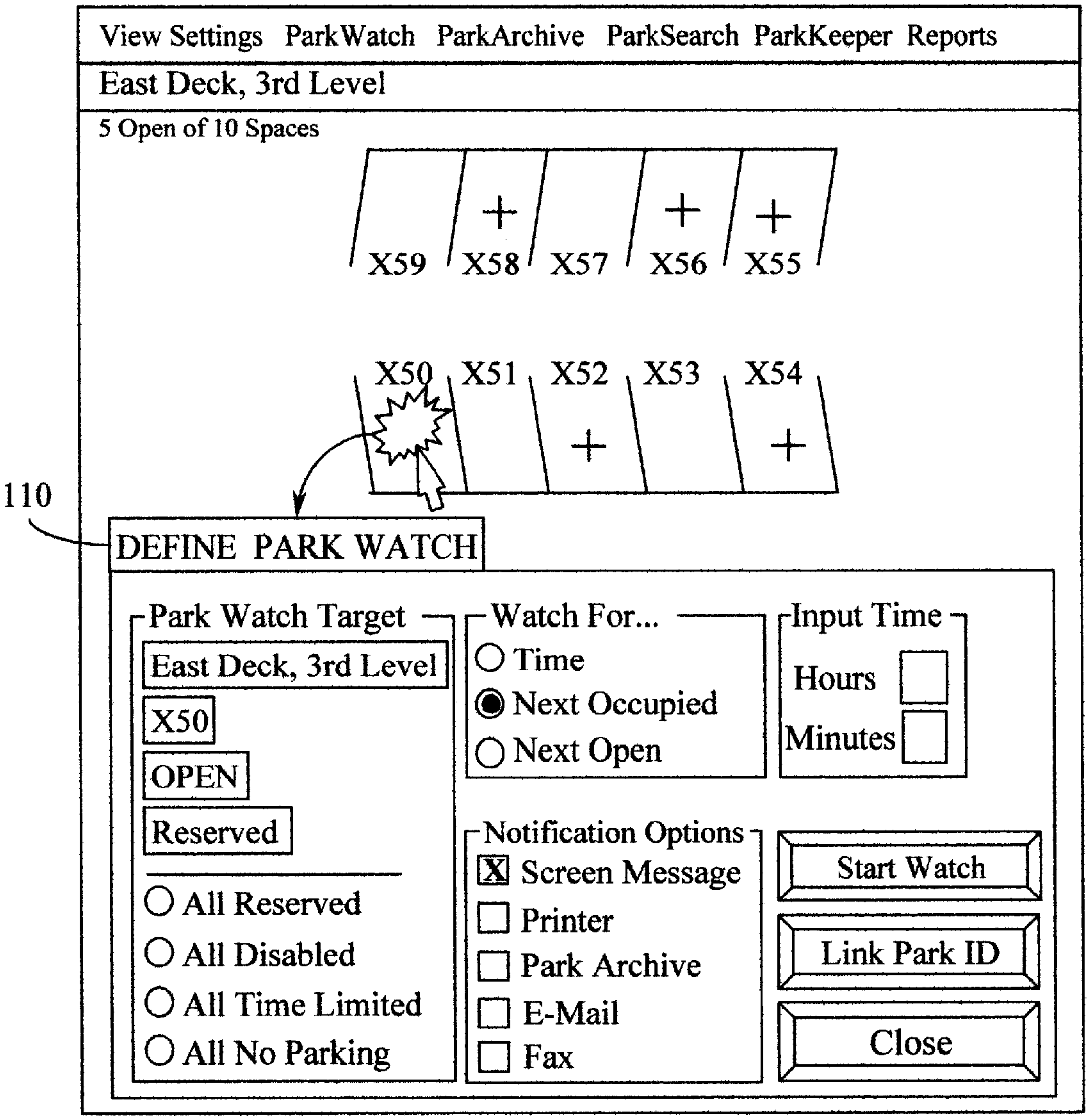
FIG. 6 is a view of the Park Interface's graphical replica of a parking section and the defining of a notification request to monitor a vehicle or parking space.
Figure 7:
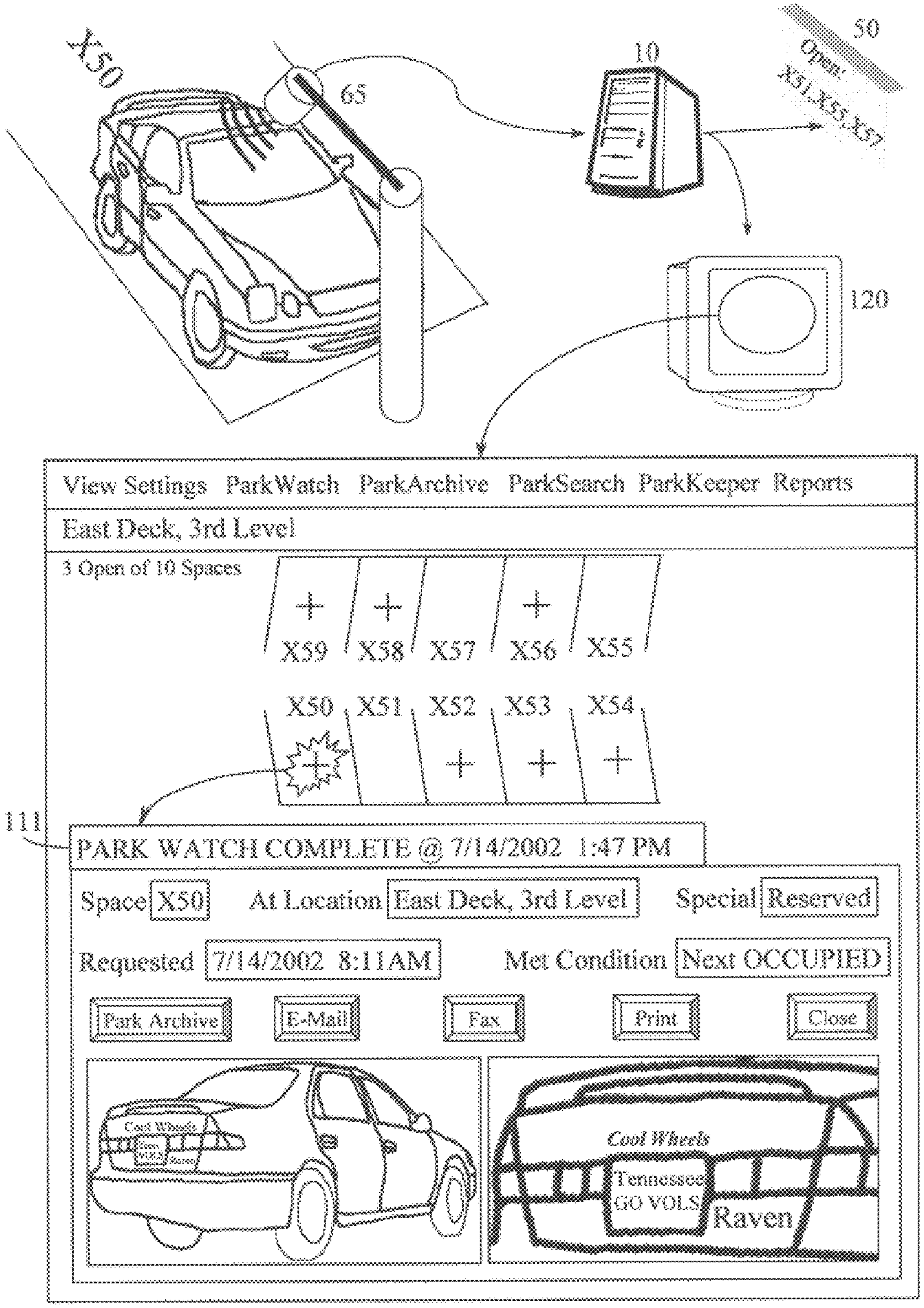
FIG. 7 shows a change in the status of a parking space and the subsequent notification on the Park Interface computer screen.

The Define Park Watch function 110 in FIG. 6 defines and requests the information provided in the Park Watch Complete function 111 in FIG. 7. The Park Watch Complete 111 function informs a facility operator when a vehicle in a targeted parking space vacates that space or when a vehicle in a targeted space remains for a period of time as specified by the facility operator. Notification is also provided the next time a vehicle parks in a targeted parking space or when a targeted parking space remains vacant for a period of time as specified by the facility operator.

As shown by example in FIG. 6, the facility operator selects a space of interest within the graphical parking replica, choosing the open space X50 on the Third Level of the East Deck. In response, the Park Interface completes the Define Park Watch 110 form with the chosen location as the "Park Watch Target". Any location selected with the computer pointer while the Define Park Watch 110 form remains open will become the "Park Watch Target". The button labeled "Link Park ID" summons the Park Identifier 90 form (FIG. 4) with the associated vehicle statistics. This gives the facility operator access to that information for every occupied space, to help determine the type of Define Park Watch 110 to request. The lower portion of the "Park Watch Target" section is a list of specially defined parking spaces such as Reserved, Handicapped, Time Limited, and No Parking. Completion of the Define Park Watch 110 form with a specially defined group requests a notification for each parking space in the group without requiring the facility operator to find each space separately and subsequently completing a separate Define Park Watch 110 form. This capability allows parking facility operators to get immediate notification and to view all vehicles that park in restricted, reserved, time-limited, and disabled parking areas.

Any or all of the "Notification Options " listed in FIG. 6 can be chosen. With the "Screen Message" option, the Park Watch Complete 111 message box in FIG. 7 is displayed on the Park Interface showing the time and date of the information and verification of the target location and type of watch (Time, Next Occupied, Next Open). The message box is accompanied by sound annunciation through a speaker connected to the computer 10. A separate screen message (Park Watch Complete 111) is displayed for each notification request whenever the controlling condition is satisfied. FIG. 6 also shows the "Printer" and "E-mail" options, which will allow the notification results to be printed or e-mailed. The "Park Archive" function is another output option and will be described later.

A notification request can be based on time or parking space occupancy, as defined in the "Watch For . . . " section in FIG. 6. A time-based notification request is satisfied when the hours and minutes entered in the "Input Time" section expire, as long as the parking status (Open or Occupied) does not change. However, if the status changes during the time-based watch, it triggers completion of the watch, with a notification message that the time-based watch was interrupted by a change in parking status (not shown).

The "Next Occupied" watch, depicted in the "Watch For . . . " section of FIG. 6, pertains to a space that is open when the notification request was defined. FIG. 7 shows the screen message for the completion of the Define Park Watch 110 requested in FIG. 6. When a vehicle parks in space X50, the parking sensor 65 detects its presence and notifies the computer 10. The computer 10 updates the display 50 in the parking section to exclude the availability of space X50.The computer 10 also updates the graphical parking replica of the Park Interface 120, by placing a parking status symbol (+) in the X50 computer screen location.

After the computer 10 verifies that space X50 is in the database of the notification requests, it activates the chosen notification option, which in this case is "Screen Message". The title of the message box includes the date and time that the condition was satisfied. The photographs taken of the vehicle as it entered the parking facility are also shown. At this point, the notification is complete. The Park Watch Complete 111 message box also has further options to e-mail or print the on screen information. Another option is to archive all information for the vehicle. A similar explanation applies to the definition and execution of a "Next Open" notification, which pertains to receiving notification when a parked vehicle vacates a target parking space.

The various functions of this system provide various ways of observing parking activity and the associated vehicles. Parking facility operators may need to document the observed activity or vehicles for future reference. Therefore the Park Archive function is accessible to the other functions (as shown in FIG. 4, FIG. 5, FIG. 6, FIG. 7, and FIG. 10) to save the vehicle statistics (including photographs) of any vehicle of interest. The archive will occur for the same parking spaces or vehicles that are the targets for those functions. Archive information can be referenced indefinitely, even long after the vehicle has departed the parking facility.

Archives can also be defined based on parking dates/times and parking occupancy. The date and time archives save the vehicle statistics of all vehicles that park in target parking locations between any two dates and times. Additional options are to perform the archive only once or at multiple intervals of time (such as daily, weekly and monthly).

The occupancy archives save the vehicle statistics of an arbitrary number of vehicles that park in target parking locations, as defined by the facility operator. Additional options are to archive the first "N" number of vehicles and then stop archiving or continuously archive the most recent "N" vehicles, where "N" is an arbitrary number. With the latter choice, the earliest archives are continuously discarded and replaced by an equal number of new archives.

Once the date and time archives or occupancy archives are defined, the computerized parking facility management system will archive the vehicle information without any human intervention. This automatic response includes conditions that meet the facility operator's repeating and continuous archive selections.

Another component of the computerized parking facility management system is the theft prevention "Park Keeper" function. Among its innovative features is its capability to protect every vehicle within a parking facility, including those that do not have an individually installed vehicle theft deterrence system. The Park Keeper function responds to an attempt to steal a vehicle by activating barriers to restrict removal of the vehicle. Furthermore, notifications of the attempted theft are provided directly to the owner of the vehicle, the police, the parking facility operators, the insurance company, and the company that tracks stolen vehicles (if applicable).

Figure 8:
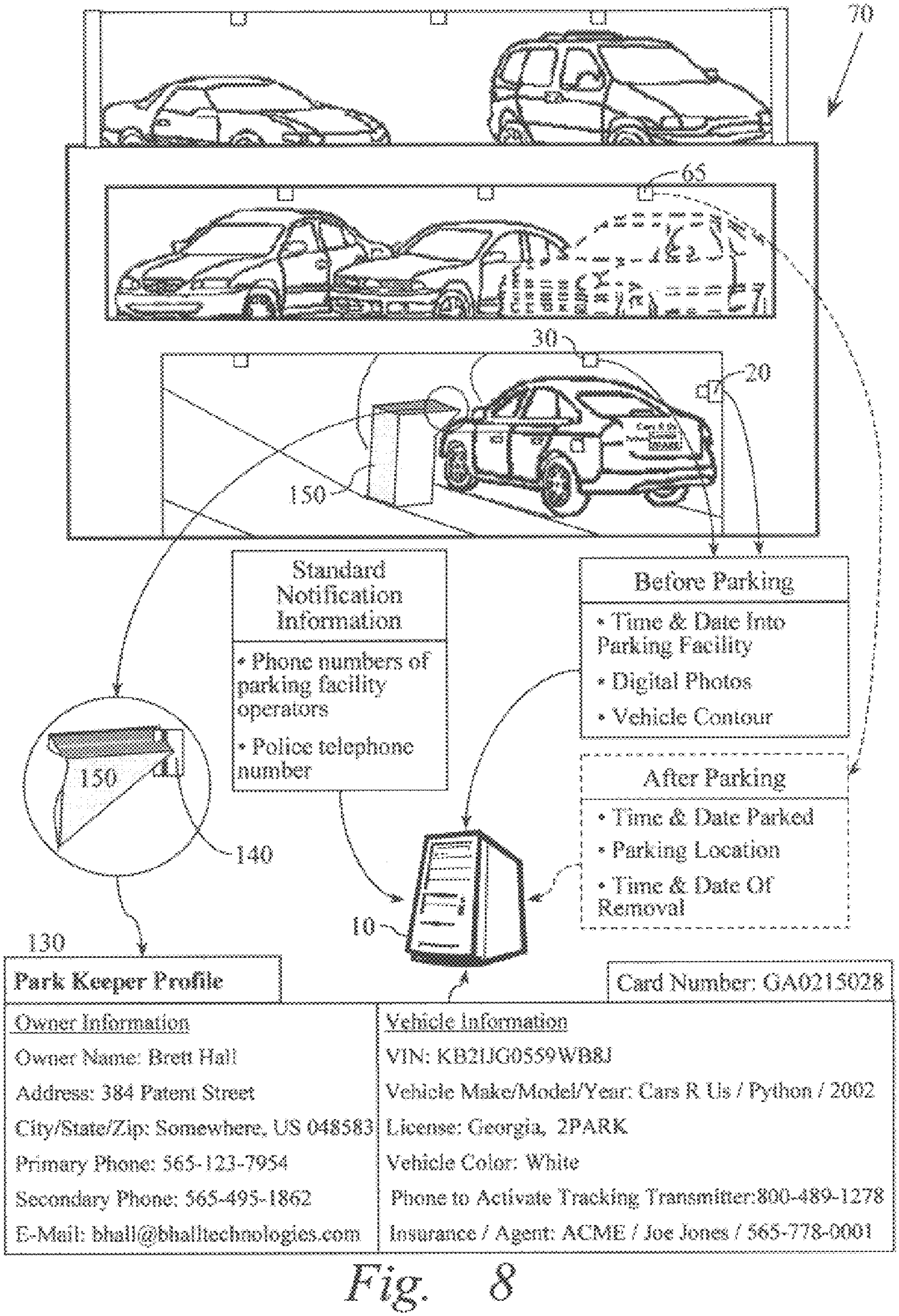
FIG. 8 shows a vehicle entering the parking facility and being registered for theft prevention by the computerized parking facility management system.

Although the following explanation features a parking garage, the theft prevention function of the present invention is also applicable to other types of parking facilities. FIG. 8 depicts a multiple-level parking facility with sensors mounted over each parking space. As the owner of a vehicle with an entry/exit card 140 enters the parking facility, the owner passes the entry/exit card 140 through the card reader 150 located at the parking facility entrance. The entry/exit card 140 is about the size of a credit card and will register the vehicle for theft prevention protection at any parking facility that is monitored by the computerized parking facility management system.

The entrance card reader 150 will also implement an alphanumeric keypad so those users entering the parking facility can employ theft prevention even without an entry/exit card 140. Although vehicle protection is still provided, the computer 10 will not have the pertinent information to contact anyone but the facility operator and the police. Their information is the "Standard Notification Information" for the facility and resides in the computer 10.

With the appropriate equipment, the tones or signals from a mobile phone, an electronic smart-card, or the wireless signal from a personal digital organizer could also transmit the Park Keeper Profile 130 instead of the entry/exit card 140 and reader 150. The entry/exit card 140 and reader 150 are presently the most prevalent technology and are presented in FIG. 8 and FIG. 9 for this reason. However, it must be noted that this invention will integrate with the alternate digital technologies, as they become more prevalent.

The exit card reader (not shown) will also include an alphanumeric keypad for the entry of a parking code. This will allow a motorist that invoked theft prevention but subsequently lost the entry/exit card 140 to still remove their vehicle without incident. The system can still fully respond to the Park Keeper Profile 130 since the information was captured at the entrance of the parking facility. The bottom of FIG. 8 shows the typical information that is transferred from the entry/exit card 140 to the Park Keeper function. This information, called the Park Keeper Profile 130, contains information that identifies the owner, methods to contact the owner, vehicle information and additional contacts to be notified if an attempt is made to steal the vehicle.

The transfer of this information into the computer 10 is the first part of the theft prevention registration. The vehicle parks on the second level, in the far right position as indicated by the vehicle with the dotted-line outline. Once the parking sensor 65 over that parking space detects the vehicle and notifies the computer 10 of the vehicle's parked location, the computer 10 associates the Park Keeper Profile 130 with the vehicle contour and photographs captured at the entrance by the entry sensor 30 and the camera 20. At that time, the registration of the vehicle is complete and the monitoring of the vehicle against theft begins.

Any removal of the vehicle after registration is detected by the parking sensor 65, and reported to the computer 10. The computerized parking facility management system tracks each registered vehicle based on the information indicating when each vehicle entered the parking facility, the vehicle contour obtained from the entry sensor 30, and other sensors positioned throughout the parking facility for vehicle tracking, as previously described.

Before the vehicle can be removed from the parking facility 70 without activating the theft prevention responses, the vehicle must be unregistered. In other words, the vehicle owner must use the entry/exit card 140 to inform the computer 10 that he is leaving the parking facility 70. This is done when the owner passes the entry/exit card 140 through the exit card reader (not shown) positioned before the exit of the parking facility 70. Signs (not shown) near the exit card reader remind the owner to use the entry/exit card 140 to remove the vehicle from registration before reaching the exit. As the owner complies, the vehicle is unregistered and can exit without incident.

Figure 9:
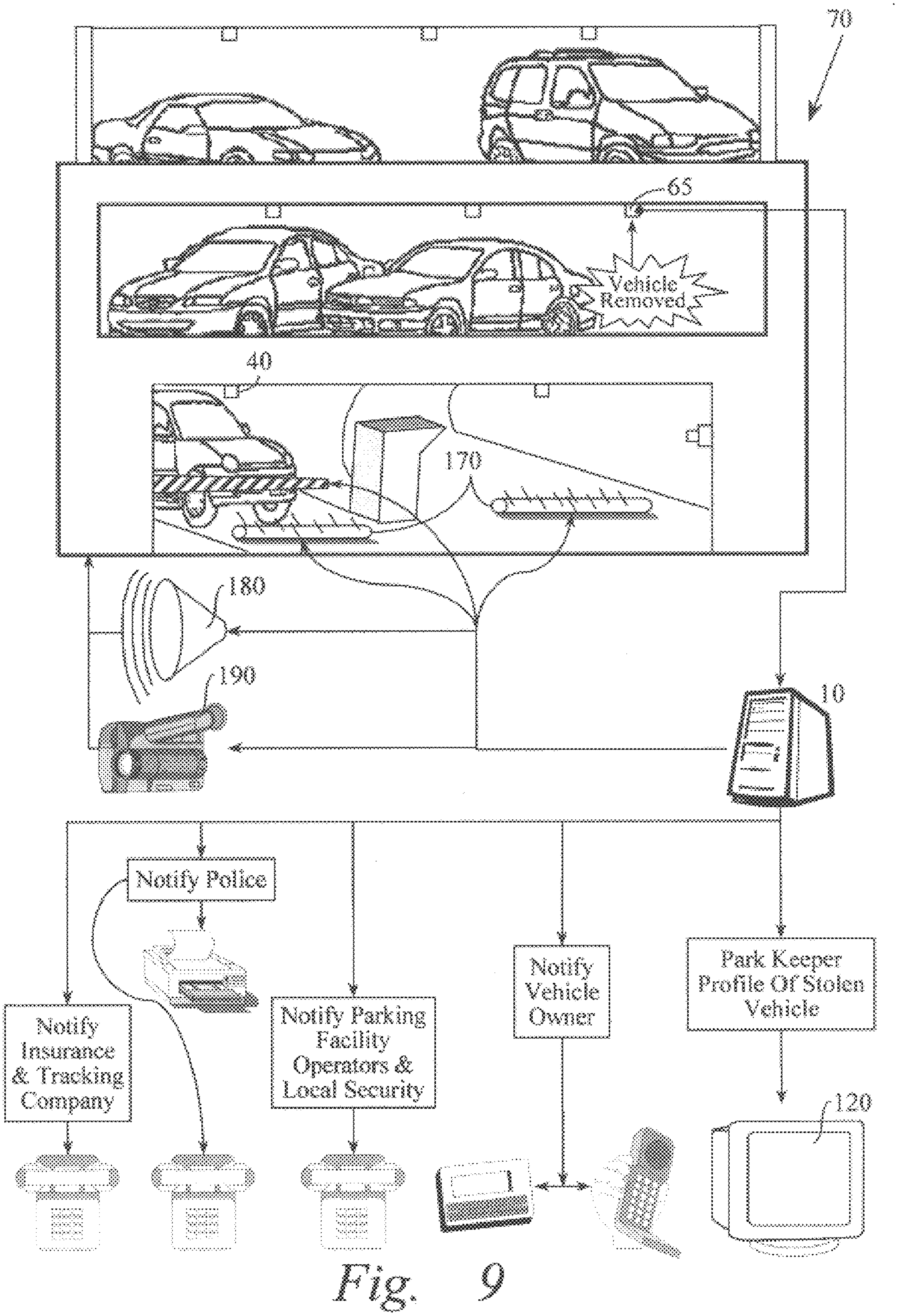
FIG. 9 is a view of the operations taken to prevent theft of a vehicle upon activation by the parking facility management system.

Consider what happens in FIG. 9 when an attempt is made to steal a vehicle that is monitored by the Park Keeper theft prevention function. The parking sensor 65 detects the removal of the vehicle, informs the computer 10, and the system tracks the vehicle. The perpetrator will not be able to discontinue the registration of the vehicle without the enter/exit card, which is still in the owner's possession. An exit sensor 40 is positioned immediately past an exit card reader (not shown), but before the exit itself. When the exit sensor 40 detects the still unregistered vehicle, the computer 10 activates the theft prevention responses shown in FIG. 9.

The deterrence includes several responses. Physical barriers 170 are activated to prevent the vehicle's exit. The barriers 170 in FIG. 9 are intended to deflate the tires of the stolen vehicle. There is also a barrier 170 on the entry side of the parking facility 70 in case the perpetrator attempts to exit through the entrance. The type of barrier 170 shown will still allow vehicles to safely enter the parking facility 70 because of the direction of the spikes, which will only deflate the tires of an exiting vehicle. A striped barrier arm is also lowered to reinforce to the perpetrator that their attempt to steal the vehicle has been observed and also warns that the barriers are activated. The spiked barrier and the barrier arm are examples of providing a restriction to the removal of the vehicle but other methods, such as lowering a gate, would also suffice. The focus of this invention is the activation of the chosen method of vehicle restriction and not the design of the method itself.

The computerized parking facility management system has access to modems and computer networks to allow the theft prevention function to respond to the Park Keeper Profile 130 in FIG. 8. Contact is made to the parking facility operators, local security and the vehicle owner, through their choice of communications (pager, mobile telephone, stationary phone, e-mail, or personal digital organizer). Telephone calls (automated voice or pre-recorded message) are also made to the nearest police station, the vehicle's tracking company (if applicable) and to the owner's automobile insurance agent, if the owner included this information in the Park Keeper Profile.

Figure 10:
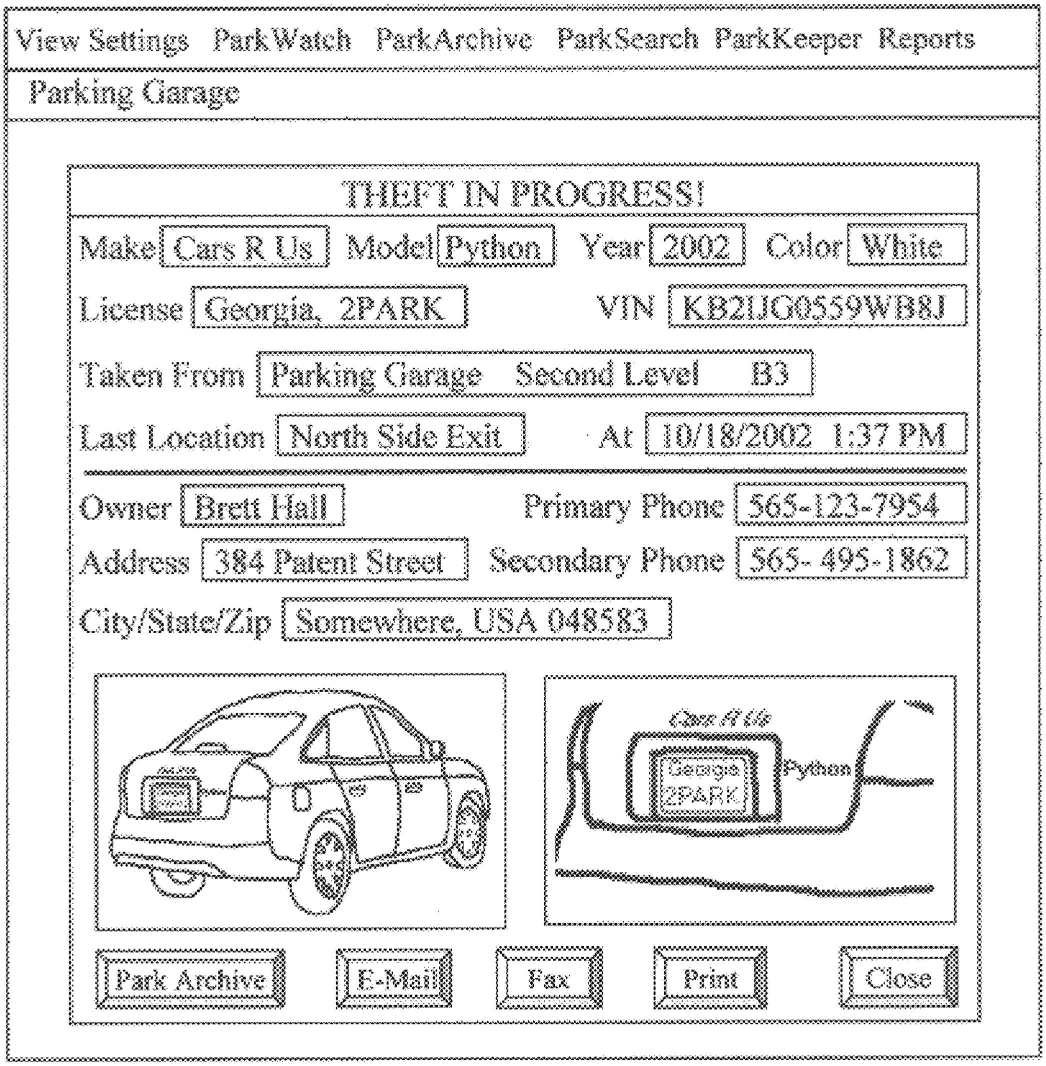
FIG. 10 shows the Park Interface displaying a theft-in-progress notification function in response to an attempt to steal a vehicle.

In FIG. 9, theft notification is also sent to the Park Interface 120, which displays the owner and vehicle information of the Park Keeper Profile 130 in FIG. 8 as the Theft-In-Progress notification in FIG. 10. Also displayed is the vehicle's parked location when taken, as well as the vehicle's location and the time/date when the theft prevention responses were activated. This informs authorities where to begin the search to retrieve the vehicle. In addition to calling the police, the Park Keeper function also faxes or e-mails FIG. 10 (including photographs) to the police. This rapid notification to the police will better ensure retention of the vehicle and possible capture of the perpetrator.

In FIG. 9, various cameras 190 positioned at the exits are activated in an attempt to capture the identity of the perpetrator. At the discretion of parking facility managers, the Park Keeper function can broadcast an alarm 180 within designated areas of the parking facility 70. This will allow the annunciation to be restricted to the vicinity of the vehicle theft. This option will be determined in advance and executed when a theft is in progress.

User participation is optional with the Park Keeper theft prevention function. Thus any motorist can choose to invoke or forego the protection. This optional choice is a different approach from the related art which demands participation in order to even park in a protected facility. The choice of each motorist to invoke the Park Keeper function through the entry/exit card or alternative technology better ensures acceptance by avoiding a forced change of the motorist's parking habits.

Figure 11:
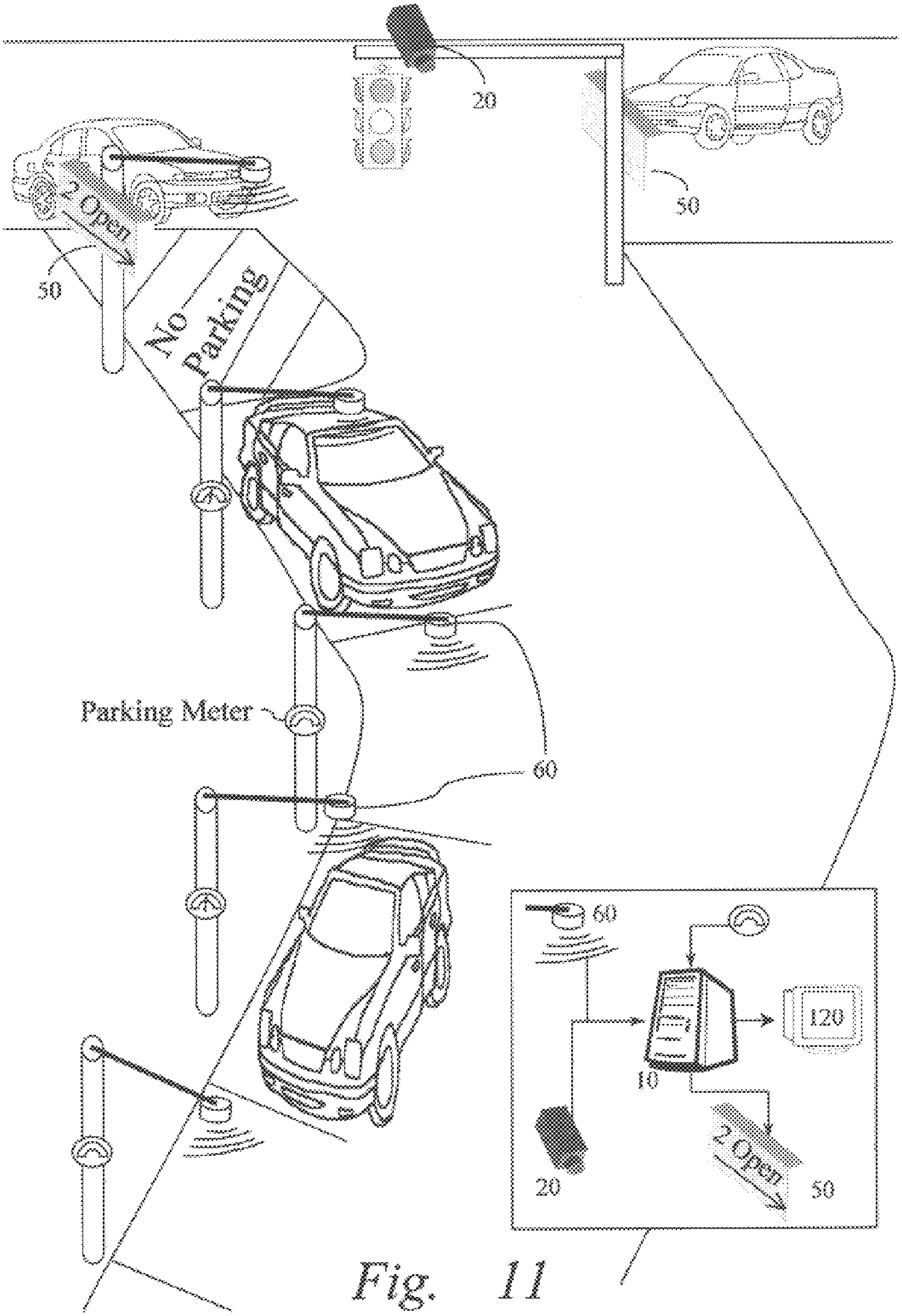
FIG. 11 is a view of the computerized parking facility management system of the present invention for street parking applications.

FIG. 11 shows another implementation of this invention, using the previously described components and concepts. The parking facility managers will be those responsible for traffic control (city government and police). The method of vehicle detection may be contour sensors or the Global Positioning System (GPS) described later as an alternate embodiment. The primary embodiment for the management of street parking uses the sensors 60, the computer 10, and the Park Interface 120 as previously described. In this depiction, the mounting supports for the contour sensors 60 may also incorporate parking meters that are integrated with the computerized parking facility management system. This arrangement would immediately notify authorities when the time on the meter expired, by employing the notification capability as shown in FIG. 7. This is similar to the described time-based notification request. The digital camera 20 in FIG. 11 serves the same purpose as the camera 20 in FIG. 1, to capture the visual vehicle identities in order to support functions previously discussed within the Park Interface.

Motorists in vehicles traveling on the main street can view the variable message displays 50 on the corners of the side street. These displays 50 indicate the number of available parking spaces along the entire street. Thus motorists looking for a place to park can avoid turning onto the street if the displays 50 indicate no available spaces. This will minimize the motorist's time and frustration as well as unnecessary traffic.

Vehicles are restricted from parking in the designated "No Parking" area so as to prevent traffic congestion and collisions with vehicles turning onto the side street. The sensor positioned to monitor this area will notify authorities of a parking violation. This provision will also help to reduce parking violations within restricted areas such as fire zones, truck loading areas and private driveways. The inset diagram of FIG. 11 shows the input to and output from the system computer 10.

Figure 12:
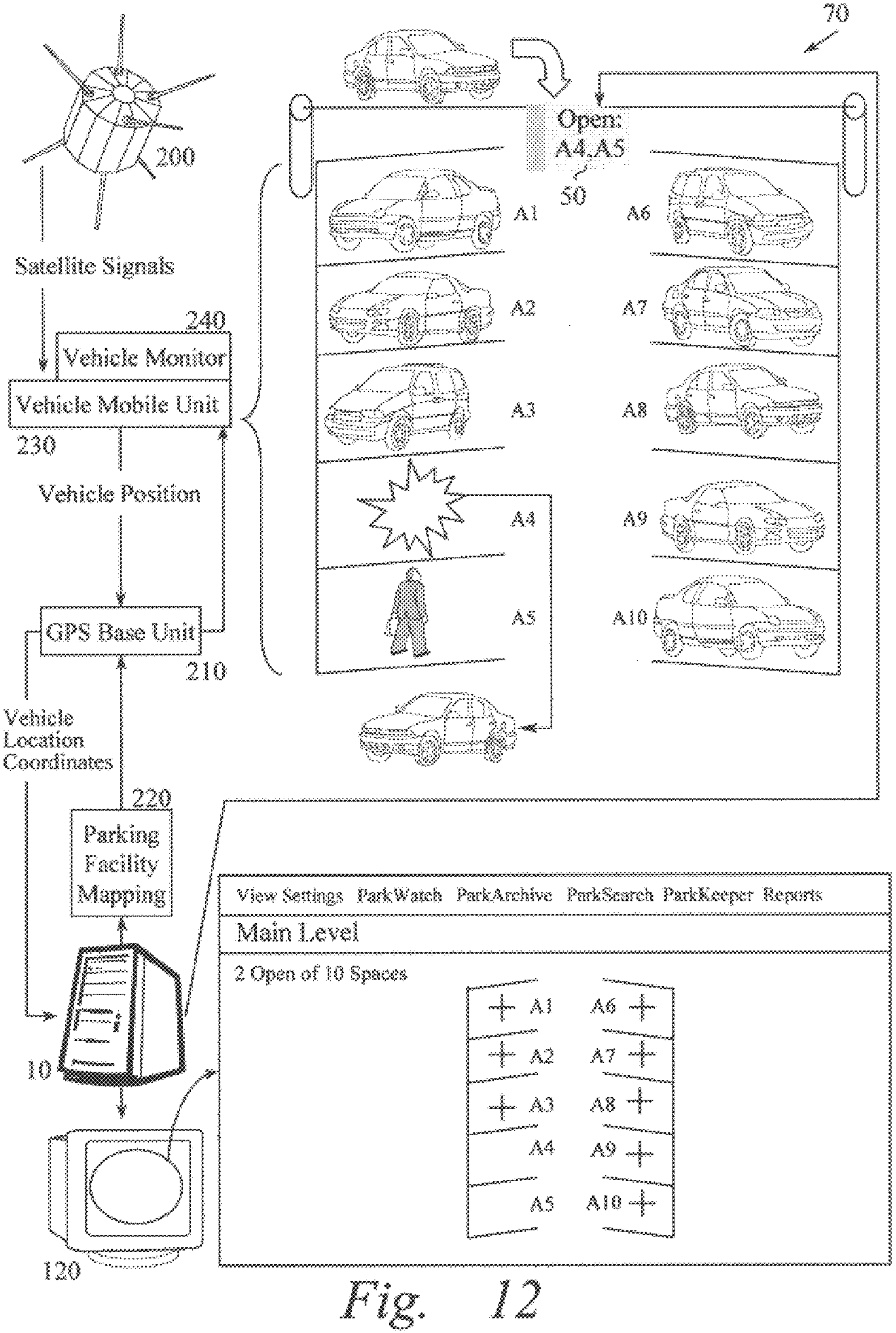
FIG. 12 is a second embodiment integrating global positioning system (GPS) technology with the computerized parking facility management system of the present invention.

The preferred embodiment uses sensors to track and detect the presence of a vehicle within a given space. An alternate embodiment of the computerized parking facility management system is shown in FIG. 12. With the advent of Global Positioning System (GPS) technology, the location of a vehicle can be precisely detected and tracked. Thus the location of a vehicle equipped with the necessary components can be determined within the parking facility 70 as part of its unique identification. The vehicle characterization of a GPS-equipped vehicle includes the capture of the GPS signal location coordinates that are unique to that vehicle. The motorist can be directed to available parking spaces using the monitor 240 within the vehicle possessing the GPS or with the display 50. Exclusive use of the display 50 for notification of available spaces is a less preferred option but would not require the parking facility map 220 or the monitor 240. GPS components are available from various vendors. GPS technology will integrate very appropriately with the Park Interface 120 because of the simultaneous tracking of multiple vehicles that GPS technology can provide. An example of this implementation is fleet management.

The GPS is a mobile positioning system that combines an antenna and receiver with a wireless communications network. The network is typically either cellular/PCS, radio, or satellite technology. A mobile unit 230 and attached monitor 240 reside inside the vehicle. Using a transceiver the mobile unit 240 calculates vehicle position from the signals of the GPS satellite 200 and sends the information to the base unit 210 that is connected to the system computer 10. The base unit 210 manages communication with and supports vehicle tracking of all GPS-equipped vehicles in the parking facility.

The base unit 210 provides the computer 10 with the location coordinates of each vehicle. The computer cross-references the coordinates against the location of the parking spaces from a database to determine the parking location of the vehicle. The display 50 is updated accordingly as well as the parking status within the graphical parking replica of the Park Interface 120. Software components within the base unit 210 and the mobile unit 230 include an interface to mapping applications. This supports the transmission of a map 220 to the mobile unit 230 for viewing the vehicle's position superimposed on a background map through the monitor 240. Typically the background map shows the streets in the vicinity of the vehicle to provide navigation to the driver. For parking applications, the background map is a map 220 of the parking facility and is transmitted to the mobile unit 230. The map 220 may resemble the graphical parking replica and allows the driver to view the vehicle monitor 240 to determine the available parking spaces.

Customized map databases for the parking facility can be created by Geographic Information Systems (GIS), as provided by various vendors.

Greater accuracy in determining the parking location of a vehicle can be accomplished by using Differential GPS, which compares the GPS measurements in the mobile unit 230 with GPS measurements taken from a reference station at a fixed location. The difference indicates the errors in each satellite's signals and corrections are made to determine the vehicle's location within the area of a parking space. Additional reliability in tracking a vehicle to its parking location can be accomplished using techniques such as Dead Reckoning which compensates for areas within the parking facility where GPS signals may be blocked by determining the vehicle's current position based on its last known position. The details of Differential GPS and Dead Reckoning are available from GPS vendors.

The GPS system is an alternative or additive vehicle characterization, identification and tracking means to the contour methodology, and will integrate into the computer 10 and the Park Interface 120. Thereafter, the features and functions of the Park Interface are provided as previously described. Distinction between GPS-equipped vehicles and other objects can be achieved by integrating aspects of vehicle contouring or validating that the change rate of location coordinates along the defined roadways of the parking facility are indicative of a vehicle. The GPS technology may eventually offer advantages over the preferred embodiment because of less equipment. However, at this time, the GPS is the secondary embodiment because of the insufficient number of vehicles with such positioning systems.

Parking revenue control within charge-for-parking facilities is a major effort in the parking industry. Parking revenue control includes the calculation of fees, collection of fees, revenue accounting, and the detection of parking violators. Because of its importance this invention does provides integration with revenue control efforts. One integration link between the computerized parking facility management system and parking revenue control is an electronic parking meter. An electronic parking meter is capable of providing a distinct electrical signal upon the expiration of time on the meter. That activation signal, or the absence of it, is transmitted to the system computer for processing and used to provide access to the functions of this invention.

Parking facility operators can receive immediate notification of all parking meters with expired time as described for FIG. 11. But more importantly the operators can see the associated vehicle, its location and vehicle statistics through the Park Interface. This capability is equivalent to the Park Watch Complete 111 function based on time expiration and would be similar to FIG. 7, but the "Met Condition" information would indicate "Meter Expired". Once the parking revenue control system is integrated into the computerized parking facility management system, the on-screen notification can then be printed, e-mailed, faxed, or archived.

The period between the expiration of time on the meter and the observance of the expired meter by a parking attendant is typically unknown. Often a motorist is charged for the expired meter time through the issuance of a fine. This is usually done because the revenue lost since the meter expired can not be computed because the associated time period is unknown. The penalty amount may be well over or under what the cost would be if the time period in question were known. This invention allows the proper parking charge to be determined despite the expiration of the meter. The Park Identifier 90 function shown in FIG. 4 will reveal the vehicle identities and the present accumulated revenue. The expiration of the meter time does not affect the independent ability of the present system to determine the accumulated revenue because the system uses the time since detecting the parking of the vehicle and the charge rate. Documentation of the revenue owed at any point in time may be archived or transmitted using the command buttons.

Many parking revenue operations lose money because of inadequate accounting. The money earned is either not reported in a timely manner or not reported accurately. The computer screen of the Park Interface shows the menu option "Reports". The Reports function allows parking facility managers to get reports of the revenue for various time periods as well as for various locations (named sections) of the facility. This information is available because the system accounts for the revenue accumulated by each vehicle that parks in the facility as well as by the name given to the section of the facility where each vehicle parks. Even after the vehicle exits the facility the revenue charged to that vehicle is stored in a database. Managers can obtain reports by manual requests or inform the system to send periodic reports automatically by e-mail or faxed to designated persons.

The Park Watch function can also determine when a motorist parks but does not pay. The system detects and identifies a vehicle when it enters the parking space as shown in FIG. 7. When the prolonged signal from an electronic parking meter continues to indicate that no payment has been made, the Park Watch 111 function will inform facility operators by displaying an on-screen message similar to FIG. 7. The "Met Condition" information would indicate "No Payment". The Park Archive function can store the documentation for later retrieval or the information can be printed or transmitted by e-mail or fax.

The Park Search function can support revenue control with the inclusion of search criteria to find and display the identities and locations of all parked vehicles with expired meters. As similarly shown in FIG. 5, this information can then be printed, archived for future retrieval, and transmitted by e-mail or fax.

As previously described, the Park Keeper theft prevention function provides various communications to notify selected persons, activation of cameras to document attempts to drive a vehicle through the exit of the parking facility as well as various alarms and barriers. These features can also be used to capture the identities and impede the exit of a vehicle whose driver attempts to exit the facility without paying. The appropriate persons (parking managers, parking security) can also be contacted through one of the communication options. An indication from the parking meter that a motorists has not paid coupled with the vehicle tracking and vehicle identification abilities of this invention will allow the system to automatically detect violators and enact the predetermined responses.

Many charge-for-park facilities use tickets instead of parking meters to control the collection of revenue. The ticket is time-stamped, issued to a motorist upon entry into the facility and collected upon exiting to determine the parking duration and associated charge. The loss of a parking ticket results in overcharges, undercharges, and disputes. Parking operators conduct manual, time-consuming, and costly daily inventory of all vehicles in the parking facility to document a vehicle's presence at a particular date and time, to support the cost charged to a disputing motorist who claims a lost ticket and a lesser parking duration.

The present invention automatically performs a continuous inventory of all vehicles within the parking facility by identifying and documenting the presence of a vehicle upon entry into the facility. Thus the time and associated costs of manual inventories are eliminated. Furthermore, as shown in FIG. 4, the present system provides a continuous calculation of the parking fee with documentation of the vehicle's entry into the facility. Thus the present system not only reduces the dependence on tickets but also provides the documentation to resolve disputes regarding the entry time and parking duration. If required, the parking facility operator can print the content of FIG. 4 to validate the charge to the motorist. The information can also be archived for later retrieval and transmission even long after the vehicle has exited the facility.

It is to be understood that the present invention is not limited to the embodiments described above, but encompasses any and all embodiments within the scope of the following claims.

I claim:

1. A computerized system for the operation and management of a parking facility including any and all spaces used to park vehicles, said system comprising:

first vehicle characterization means for capturing inherent attributes of each vehicle upon or after its entry into the parking facility;

means for tracking each vehicle within the parking facility; and computer means communicating with said vehicle characterization means and said tracking means, said computer means operative for processing and displaying data pertaining to the location and identification of each vehicle within the parking facility.

2. The system according to claim 1, further comprising a camera manes for photographing each vehicle and its license plate upon or after entry into the parking facility, said camera means communicating with said computer means.

3. The system according to claim 1, wherein the presence and absence of vehicle contour related information indicates the date and time of a vehicle's arrival into the departure from the parking space and parking facility.

4. The system according to claim 1, wherein said tracking means includes at least one subsequent vehicle characterization means for capturing contour features of each vehicle to determine each vehicle's location within the parking facility, said subsequent vehicle characterization means communicating with said computer means.

5. The system according to claim 1, wherein said computer means contain a database of contour related information for comparing vehicle characterizations of said first or subsequent vehicle characterization means, whereby the location of a vehicle is determined.

6. The system according to claim 1, wherein said computer means contain a database of known contour related information for different vehicle makes and models for comparing with vehicle characterizations of said first or subsequent vehicle characterization means, whereby the make and model of each vehicle is determined.

7. The system according to claim 1, further comprising a plurality of display means disposed within the parking facility for indicating the availability of parking spaces.

8. The system according to claim 1, wherein said computer means includes means for displaying data pertaining to each vehicle's identification and activities within the parking facility.

9. The system according to claim 8, wherein said means for displaying includes a representation of a section of the parking facility showing number and location of parking spaces, and parking status of each of the parking spaces.

10. The system according to claim 1, wherein said computer means includes control means for assessing said data and configuring the appearance of said means for displaying.

11. The system according to claim 10, wherein said control means includes means for searching the parking facility to locate a vehicle based on a selected criteria.

12. The system according to claim 10, wherein said control means includes means for identifying a vehicle based upon manual invocation, time expiration, vehicle activities and unauthorized vehicle removal.

13. The system according to claim 1, further including theft prevention means for restricting the unauthorized removal of a vehicle from the parking facility, said theft prevention means includes a means for registering a vehicle for theft protection.

14. The system according to claim 13, wherein said theft prevention means includes cameras, alarms and barriers activated by said computer means upon an attempted theft of a vehicle from the parking facility.

15. The system according to claim 13, where said theft prevention means further includes means for automatically notifying appropriate persons of the attempted theft.

16. The system according to claim 1, wherein said vehicle characterization means and said tracking means includes GPS technology.

17. The system according to claim 16, wherein a graphical representation of the section of the parking facility showing availability of spaces is displayed on the monitor of a GPS-equipped vehicle.

18. The system according to claim 1, wherein said vehicle characterization means and said tracking means includes technology to capture vehicle contour features.

19. The system according to claim 1, wherein the presence and absence of vehicle contour related information indicates the occupancy status of parking spaces.

20. A computerized system for determining and indicating the availability of parking spaces within a parking facility including any and all spaces used to park vehicles, said system comprising:

vehicle characterization means for distinguishing between vehicle and non-vehicle objects that are in predetermined spaces of the parking facility;

means for displaying available parking spaces within a section of the parking facility; and computer means communicating with said vehicle characterization means and said display means, said computer means operative for processing real-time information pertaining to the presence and absence of the vehicles in the spaces of the parking facility.

21. The system according to claim 20, wherein said computer means includes means for displaying a representation of a section of the parking facility showing availability of spaces within the section of the parking facility.

22. The system according to claim 20, wherein the presence and absence of information from each vehicle characterization means indicates the occupancy status of the parking spaces.

23. A method for managing parking spaces comprising:

a) characterizing a vehicle a first time to capture inherent vehicle attributes;

b) characterizing the vehicle a subsequent time, at a different location from said first characterization; and c) comparing said first and subsequent vehicle characterizations to determine each vehicle's identification and activities within the parking spaces and within the managed areas associated with said parking spaces.

24. The method of claim 23, further comprising integrating with parking revenue operations.

* * * * *

UNITED STATES PATENT AND TRADEMARK OFFICE

CERTIFICATE OF CORRECTION

PATENT NO. : 6,340,935 B1
DATED : January 22, 2002
INVENTOR(S) : Brett O. Hall

It is certified that error appears in the above-identified patent and that said Letters Patent is hereby corrected as shown below:

Column 17,
Line 33, replace “manes” with -- means --,
Line 37, replace “into the” with -- into and --, Column 18,
Line 9, replace “restricting” with -- detecting, tracking, and restricting --,
Line 17, replace “where” with -- wherein --, Signed and Sealed this Eighth Day of June, 2004

JON W. DUDAS
*Acting Director of the United States Patent and Trademark Office*